United States Patent
Ezry et al.

(10) Patent No.: US 10,671,928 B2
(45) Date of Patent: Jun. 2, 2020

(54) ADAPTIVE ANALYTICAL MODELING TOOL

(71) Applicant: INTERNATIONAL BUSINESS MACHINES CORPORATION, Armonk, NY (US)

(72) Inventors: Raphael Ezry, New York, NY (US); Munish Goyal, Yorktown Heights, NY (US); Jingzi Tan, Chicago, IL (US); Shobhit Varshney, Somers, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 827 days.

(21) Appl. No.: 15/251,391

(22) Filed: Aug. 30, 2016

(65) Prior Publication Data

US 2018/0060737 A1    Mar. 1, 2018

(51) Int. Cl.
*G06N 5/02* (2006.01)
*G06N 7/00* (2006.01)

(52) U.S. Cl.
CPC ............ *G06N 5/022* (2013.01); *G06N 7/005* (2013.01)

(58) Field of Classification Search
CPC ............ G06N 3/10; G06N 20/00; G06N 5/02; G06N 5/022; G06N 5/025; G06N 3/082; B60W 30/095
See application file for complete search history.

(56) References Cited

U.S. PATENT DOCUMENTS

| | | | |
|---|---|---|---|
| 6,064,971 | A | 5/2000 | Hartnett |
| 7,321,883 | B1 | 1/2008 | Freedy et al. |
| 7,499,897 | B2 | 3/2009 | Pinto et al. |
| 7,707,059 | B2 | 4/2010 | Reed et al. |

(Continued)

FOREIGN PATENT DOCUMENTS

| CN | 103744919 A | 4/2014 |
|---|---|---|
| WO | 2010030439 A1 | 3/2010 |

OTHER PUBLICATIONS

Don et al., "Automated Self-Service Modeling: Predictive Analytics as a Service", Mar. 2013, Informations Systems and E-Business Managment. pp. 119-140 (Year: 2013).*

(Continued)

*Primary Examiner* — Paulinho E Smith
(74) *Attorney, Agent, or Firm* — James Nock; Hye Jin Lucy Song; Heslin Rothenberg Farley & Mesiti PC

(57) ABSTRACT

The methods include, for instance: building model connections between models in a knowledgebase, which stores case data as model networks. An exploration probability stored in the knowledgebase indicates a likelihood of new connections based on a case data input to be employed for an analytical model of the case data input, which includes numerous stages and multiple model choices in each stage. Based on the new connections and model networks of the knowledgebase, paths are created and performance of respective paths/connections are evaluated. A predefined number of top performing paths are selected and the models and attributes that do not appear in the top performing paths (Continued)

are eliminated from the knowledgebase. Probabilities of model networks and a future case data input are updated accordingly and a best-fit model for the case data input is presented to a user.

20 Claims, 8 Drawing Sheets

(56) References Cited

U.S. PATENT DOCUMENTS

| | | | |
|---|---|---|---|
| 7,756,810 | B2 | 6/2010 | Nelken et al. |
| 8,001,119 | B2 | 8/2011 | Aggarwal et al. |
| 8,194,848 | B2 | 6/2012 | Zernik et al. |
| 8,463,816 | B2 | 6/2013 | Skubacz et al. |
| 8,930,305 | B2 | 1/2015 | Namburu et al. |
| 8,977,540 | B2 | 3/2015 | Yasin |
| 2005/0071150 | A1 | 3/2005 | Nasypny |
| 2005/0234688 | A1 | 10/2005 | Pinto et al. |
| 2011/0066590 | A1 | 3/2011 | Chang et al. |
| 2014/0156568 | A1 | 6/2014 | Ganguly et al. |
| 2015/0073873 | A1 | 3/2015 | Williams et al. |
| 2015/0142719 | A1 | 5/2015 | Behuria et al. |
| 2016/0092799 | A1 | 3/2016 | Khan et al. |
| 2016/0205697 | A1 | 7/2016 | Tan et al. |
| 2017/0147955 | A1* | 5/2017 | Ezry ............... G06Q 10/06313 |
| 2018/0060737 | A1* | 3/2018 | Ezry ............... G06N 5/022 |
| 2018/0137766 | A1* | 5/2018 | Bostick ............... G06Q 50/30 |

OTHER PUBLICATIONS

Kridel, Don, et al., "Automated self-service modeling: Predictive analytics as a service." Retrieved from the Internet <URL: https://www.researchgate.net/publication/257490543_Automated self-service_modeling_Predictive_analytics_as_a_service>, Information Systems and e-Business Management 11(1)—Mar. 2013, 2 pgs.

Füssl, Franz, et al., "Modeling Knowledge Bases for Automated Decision Making Systems—A Literature Review" [retrieved on Aug. 25, 2016]. Retrieved from the Internet <URL: http://thesai.org/Downloads/Volume6No9/Paper_25-Modeling_Knowledge_Bases_for_Automated_Decision_Making_Systems.pdf>, (IJACSA) International Journal of Advanced Computer Science and Applications, vol. 6, No. 9, 2015, pp. 185-189.

Chatti, M.A., et al., "A Reference Model for Learning Analytics" [retrieved on Aug. 25, 2016]. Retrieved from the Internet <URL: http://www.thues.com/upload/pdf/2012/CDST12_IJTEL>, International Journal of Technology Enhanced Learning (IJTEL)—Special Issue on "State-of-the-Art in TEL" 2012, 22 pgs.

Mell, Peter, et al., "The NIST Definition of Cloud Computing", NIST Special Publication 800-145, Sep. 2011, Gaithersburg, MD, 7 pgs.

Esfahani, Naeem et al., "A Learning-Based Framework for Engineering Feature-Oriented Self-Adaptive Software Systems," IEEE Transactions on Software Engineering, Aug. 5, 2013, pp. 1-27.

* cited by examiner

ADAPTIVE ANALYTICAL MODELING TOOL

TECHNICAL FIELD

The present disclosure relates to analytical modeling tool, and more particularly to methods, computer program products, and systems for automatic and adaptive modeling for analytics.

BACKGROUND

In conventional analysis process, complexity associated with a number of stages in the analysis, a number of models in each stages, parameters, input choices and variables for each model exponentially increase a number of cases to examine in order to discover an optimal analytical path.

SUMMARY

The shortcomings of the prior art are overcome, and additional advantages are provided, through the provision, in one aspect, of a method. The method for adaptive analytical modeling includes, for example: obtaining, by one or more processor of a computer, a case data input for an analysis in a number of stages; building all model connections between models in the knowledgebase with a complementary of an exploration probability, wherein the knowledgebase stores one or more model networks and the exploration probability indicating a likelihood to discover a new model network that performs well and that is not stored in the knowledgebase; integrating new model connections based on the case data input into the knowledgebase with the exploration probability; selecting a predefined number of paths that perform best based on ranking respective model connections from the building and the integrating by use of preconfigured performance metrics, wherein each of the paths includes respective models in each of the stages and respective model connections from a first stage through a last stage; eliminating one or more poor models and attributes associated with respective poor models from the knowledgebase, wherein the poor models do not present in the paths from the selecting; updating a model network probability indicating a likelihood to use the model networks stored in the knowledgebase as resulted from the eliminating, by use of the exploration probability; calculating a new exploration probability for another case data input in using the knowledgebase as resulted from the updating; and producing the predefined number of paths from the selecting, without the poor models as resulted from the eliminating, to a user as a best-fit model for the analysis of the case data.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
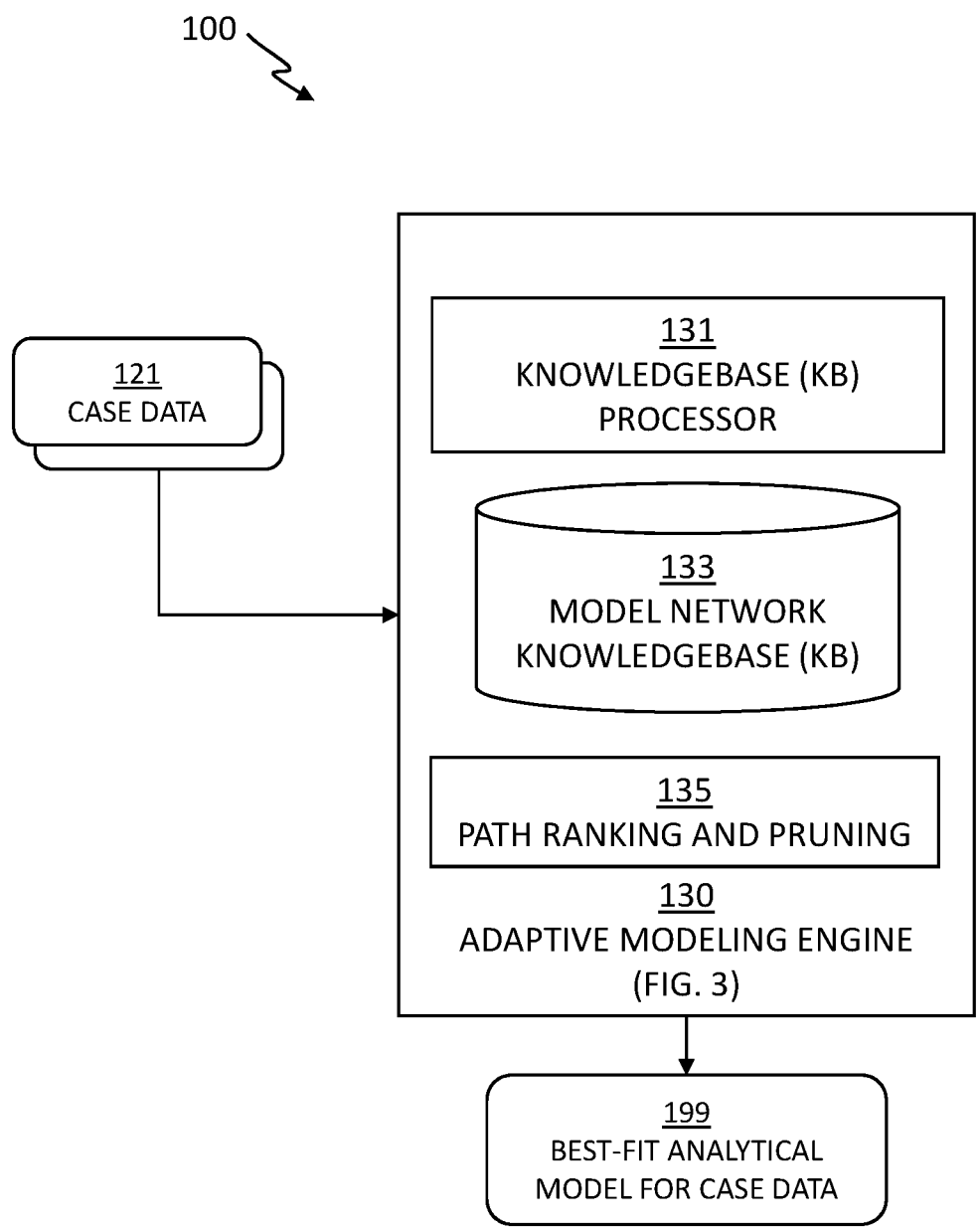
FIG. 1 depicts a system for automatically generating an adaptive analytical model, in accordance with one or more embodiments set forth herein.

FIG. 1 depicts a system 100 for automatically generating an adaptive analytical model, in accordance with one or more embodiments set forth herein.

The system 100 includes an adaptive modeling engine 130 that takes one or more case data 121 as input and generates a best-fit analytical model for the case data 199. The adaptive modeling engine 130 includes a knowledgebase (KB) processor 131, a model network knowledgebase (KB) 133, and a path ranking and pruning process 135. Detailed operations of the adaptive modeling engine 130 are described in FIGS. 3, 4, 5, and corresponding descriptions.

Analytical modeling tools typically execute multiple models and simultaneously rank models based on preconfigured metrics in order to find a series of models along with input-output connections with other models, referred to as a model network in this specification, which fits best for a business case to analyze, amongst many candidate model networks. Typical analysis for business cases includes multiple stages of model execution with multiple models to choose from on each stage, and adding parameter choices, variables and inputs for each model as executed in stages would exponentially increases complexity of analytical modeling, and consequently, a number of candidate model networks to discover a best-fit model for a business case would be prohibitively large. However, due to rapid evolution in complex machine learning algorithms coupled with ever-increasing needs for fast deployment across diverse business use cases, it is desirable to reduce modeling complexities for users of modeling tools such that the users may easily perform business case data analysis on a large scale without having in-depth knowledge of underlying model complexities.

The path ranking and pruning process 135 generates a predefined number of best performing model networks from the one or more case data 121. The KB processor 131 associates respective probabilities with model networks as generated by the path ranking and pruning process 135 and updates the model network KB 133 such that the best-fit analytical model for the case data 199 for a specific case data may be efficiently discovered according to the respective probabilities. As similar cases are repeatedly analyzed over time, the adaptive modeling engine 130 cumulates more model networks fit for an analysis case in the model network KB 133, by use of reinforcement learning. The model network KB 133 stores the model networks as associated with the respective probabilities. The KB processor 131 and the ranking and pruning process 135 describe functionalities of the adaptive modeling engine 130, and may or may not be implemented as separate processes. Detailed operations of the path ranking and pruning process 135 are described in FIG. 4, and corresponding description. Detailed operations of the KB processor 131 are described in FIG. 5, and corresponding description.

Figure 2:
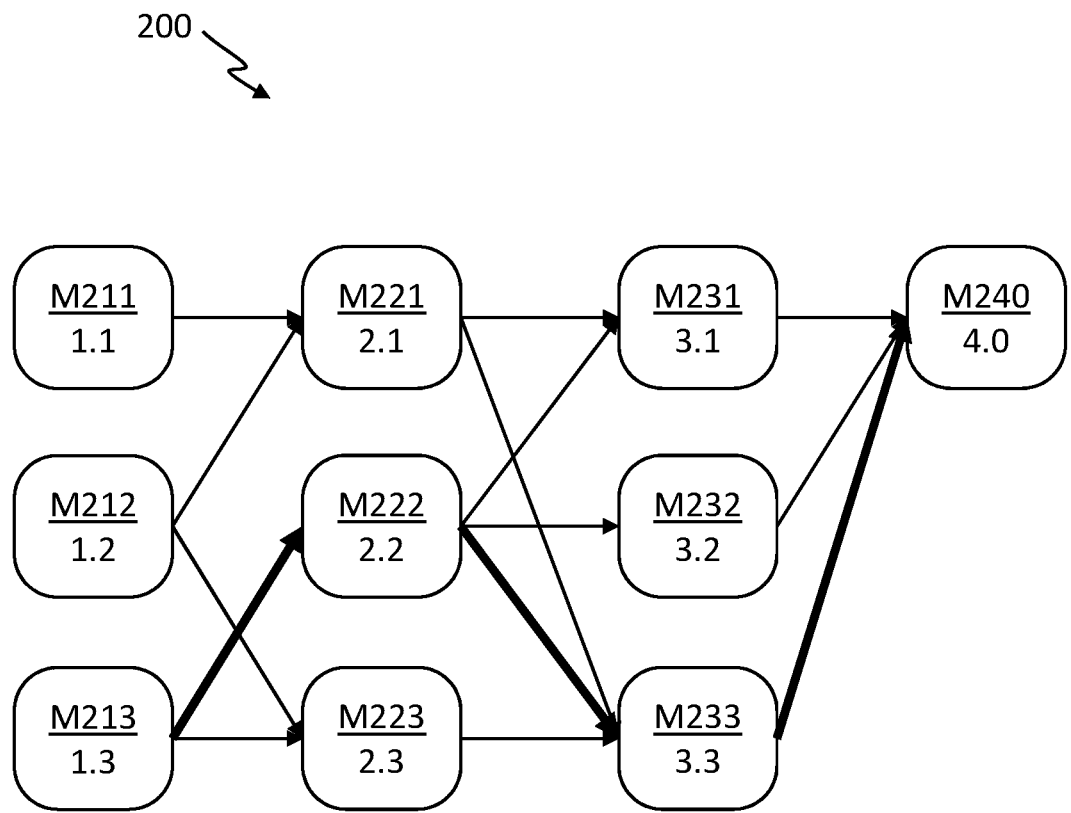
FIG. 2 depicts an exemplary modeling framework 200, in accordance with one or more embodiments set forth herein.

FIG. 2 depicts an exemplary modeling framework 200, in accordance with one or more embodiments set forth herein.

Analytics models are used to solve business problems having complex sequence of multiple models that are connected with one another through data flow streams with output of one model serving as an input to a next model, sometimes grouped in stages. The analytical models often have numerous attributes such as purpose/output, input data, parameters and variables, model types, application of de-seasoning, seasonality methods, moving average window, pre-segmentation of samples, temporal aggregation, segmentation algorithm, etc.

Particularly because of numerousness of paths from one model to the next model, within multiple-stage-multiple model sequences, examining all possible paths and discovering a best performing model paths, that is, a model network, is often a very inefficient process. In order to get a number of possible paths, a number of stages, a number of model choices in each stage, a number of parameters per model, a number of choices for each parameters, a number of inputs to each model, and a number of choices for each inputs should be compounded, and the increased dimensionality often results in prohibitively large number for a timely and efficient analysis to generate a business solution.

For example, a typical real-life analytical modeling such as to discover the most efficient city traffic route, or to predict a net sales of a pharmaceutical product, the necessary number of stages may be 7~8, the number of models per stage may be 3~5, the number of parameters per model may be 6~7, the number of choices per parameter may be 2, the number of inputs may be 30~40, and with limited choice of inputs, all possible connections are often too numerous to be manually examined or processed. Also, due to the advancement of machine learning technology, new models and new case data are constantly added to the possible number of choices.

The exemplary modeling framework 200 has three (3) stages of modeling, having three (3) models respectively, and model 4.0 M240. A first stage has model 1.1 M211, model 1.2 M212, and model 1.3 M213, a second stage has model 2.1 M221, model 2.2 M222, and model 2.3 M223, and a third stage has model 3.1 231, and model 3.2 M232, and model 3.3 M233. The models M211, M212, and M 213 of the first stage are respectively connected to one or more models of the second stage, the models M221, M222, and M 223 of the second stage are also respectively connected to one or more models of the third stage, and each model M231, M232, and M233 of the third stage is respectively connected to the is model 4.0 M240.

All connections are respectively represented by each directed arrow, which indicates an output from a model in a previous stage is an input to another model in next stage. For example, model 1.1 M211 generates an output A, which is an input to model 2.1 M221, but not to model 2.2 M222. Similarly, model 1.3 M213 generates output B, and model 2.2 M222 and model 2.3 M223, which take B as input, would be a next stage model for model 1.3 M213. Further, each model may require tuning of several parameters according to inputs and model performance criteria.

The exemplary modeling framework 200 has two paths to model 4.0 M240 from model 1.1 M211, via model 2.1 M221 to model 3.1 M231, and via model 2.1 M221 to model 3.3 M233, for the second and third stages. Also three paths from model 1.2 M212, two paths via model 2.1 M221 above, and one path via model 2.3 M223. Also four paths from model 1.3 M213, three paths via model 2.2 M222, and one path via model 2.3 M223 as above. Each path is ranked based on preconfigured performance metrics of the adaptive modeling engine 130 of FIG. 1. For example, if the connections from model 1.3 M213 in the first stage, to model 2.2 M222 in the second stage, to model 3.3 M233 in the third stage, and to model 4.0 M240, are evaluated as a data flow with the best performance, a combination of the connections are selected as a best-fit model path, as represented by thick-lined connections. Details of performance evaluation are described in FIG. 4 and corresponding description.

Figure 3:
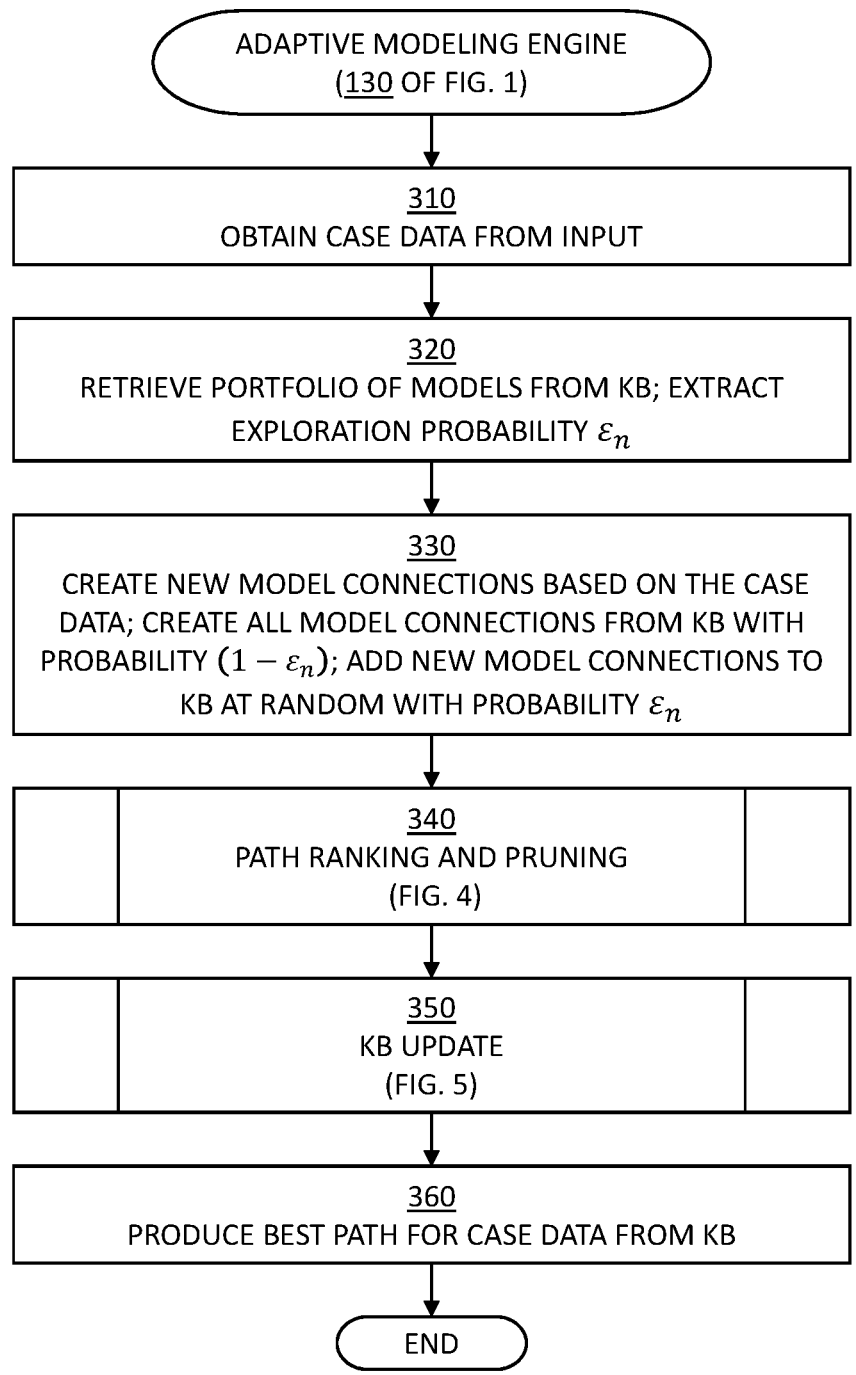
FIG. 3 depicts a flowchart for the adaptive modeling engine, in accordance with one or more embodiments set forth herein.

FIG. 3 depicts a flowchart for the adaptive modeling engine 130 of FIG. 1, in accordance with one or more embodiments set forth herein.

In block 310, the adaptive modeling engine 130 obtains case data from an input. Then adaptive modeling engine 130 proceeds with block 320.

In block 320, the adaptive modeling engine 130 retrieves a portfolio of models from the model network knowledgebase (KB) 133. The portfolio of models also include information on parameter choices and optional input variables for each model in the portfolio. The adaptive modeling engine 130 also extracts an exploration probability $\varepsilon_n$ indicating a likelihood to find a new well-performing model network/connection that is not stored in the knowledgebase amongst n cases. As the adaptive modeling engine 130 processes more case data, that is, n increases, the exploration probability $\varepsilon_n$ of a new connection decreases. Accordingly, wherein the KB 133 is mature with one thousand (1,000) distinct instances of case data, due to the sufficiency of existing model paths in the KB 133, it is very unlikely to find a new path that meets the performance criteria. Then adaptive modeling engine 130 proceeds with block 330.

In block 330, the adaptive modeling engine 130 creates new model connections based on the case data as well as all possible connections amongst the models in the portfolio of block 320. All models have respective attributes of input variables including optional variables, output variables, parameters, and a set of allowed values for each parameter. For all models, all possible connections between the models are created such that a model producing an output O1 is always connected to another model requiring O1 as an input. The adaptive modeling engine 130 adds the new model connections to the KB 133 with the exploration probability $\varepsilon_n$, extracted from block 320. The all model connections created from the portfolio of the KB 133 is associated with a probability $(1-\varepsilon_n)$, complementary of the exploration probability, and stored in the KB 133 for later use during the operations of the adaptive modeling engine 130. Then adaptive modeling engine 130 proceeds with block 340.

Figure 4:
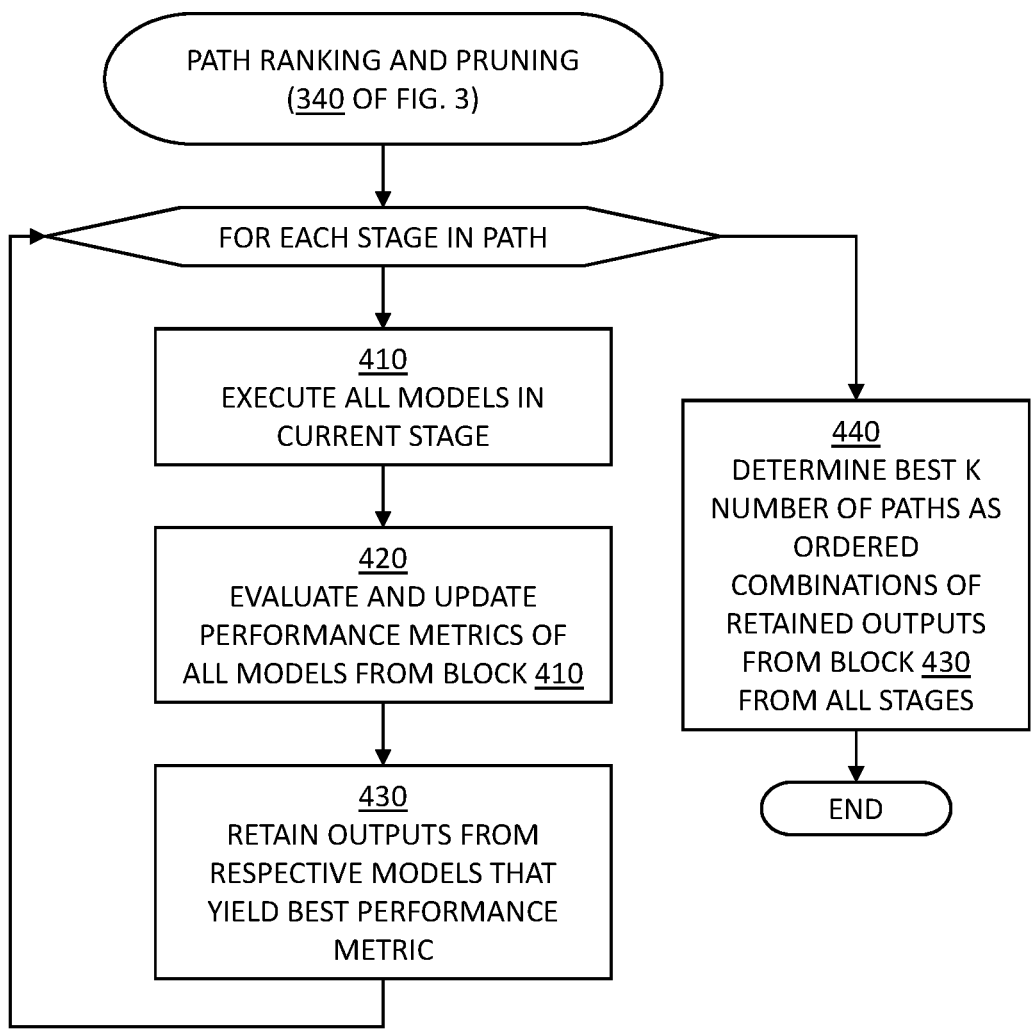
FIG. 4 depicts a flowchart for the path ranking and pruning process, block 340 of FIG. 3, in accordance with one or more embodiments set forth herein.

In block 340, the adaptive modeling engine 130 performs path ranking and pruning, as detailed in FIG. 4 and corresponding description. In this specification, terms "path" and "model path" are used interchangeably to indicate a series of model connections as created in block 330 from a first stage up to a final stage. Then adaptive modeling engine 130 proceeds with block 350.

Figure 5:
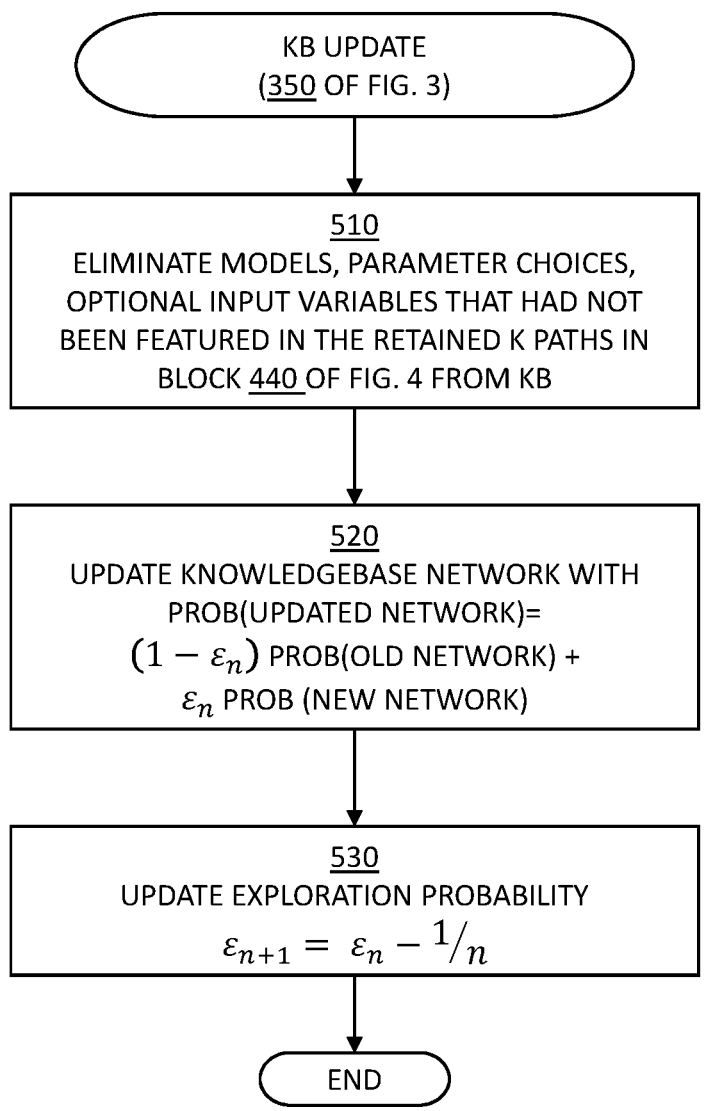
FIG. 5 depicts a flowchart for the knowledgebase (KB) update path ranking and pruning process, block 350 of FIG. 3, in accordance with one or more embodiments set forth herein.

In block 350, the adaptive modeling engine 130 updates the KB 133 and exploration probability as a new case data has been added to the KB 133, as detailed in FIG. 5 and corresponding description. Then adaptive modeling engine 130 proceeds with block 360.

In block 360, the adaptive modeling engine 130 produces a best path, that is, a best-fit analytical model, for the case data obtained from block 310. Then adaptive modeling engine 130 terminates processing the case data obtained from block 310.

FIG. 4 depicts a flowchart for the path ranking and pruning process, block 340 of FIG. 3, in accordance with one or more embodiments set forth herein.

The adaptive modeling engine 130 performs blocks 410, 420 and 430, as a unit, for each stage in a path. After performing blocks 410, 420 and 430, for the last stage in the path, the adaptive modeling engine 130 proceeds with block 440. The path ranking and pruning process uses dynamic programming method, referring to a problem solving technique that breaks a complex problem down to a collection of simpler sub-problems, solves each of the sub-problems just once, and stores respective solutions to the sub-problems for later. In the path ranking and pruning process, a path is solved by solving all models in each stage.

In block 410, the adaptive modeling engine 130 executes all models in a current stage of the path. Then adaptive modeling engine 130 proceeds with block 420.

In block 420, the adaptive modeling engine 130 evaluates and updates performance metrics of all models as executed from block 410. Then adaptive modeling engine 130 proceeds with block 430.

In block 430, the adaptive modeling engine 130 retains outputs from respective models that yield best performance metrics. Then adaptive modeling engine 130 loops back to block 410 if the current stage is not an end of the path. If the adaptive modeling engine 130 processed all stages of the path, then the adaptive modeling engine 130 proceeds with block 440.

In block 440, the adaptive modeling engine 130 determines best performing K number of paths as ordered combinations of the outputs retained from block 430 from respective models of all stages. Then the adaptive modeling engine 130 terminates the path ranking and pruning and returns to block 350 of FIG. 3.

In one embodiment of the present invention, performance metrics for a single stage model is a single-stage model performance loss function $l_n(j) = L2 \text{ Norm} = \|O1-O^*\|^2$, for model j in stage n having output of O1, wherein actual response of the model j is $O^*$. Accordingly, performance metrics for a sequence of stages model is a multi-stage model performance loss function $L = \text{sum}_n l_n(j) = L2 \text{ Norm}$. In an example of three stage path wherein model 5 in stage (n−1) having output of $O_{n-1}5$ and actual response of $O^*_{n-1}$, model 1 in stage (n) having output of $O_n1$ and actual response of $O^*_n$, and model 3 in stage (n+1) having output of $O_{n+1}3$ and actual response of $O^*_{n+1}$, the performance loss function $L = \text{sum}_n l_n(j) = L2 \text{ Norm} = \|O_{n-1}5-O^*_{n-1}\|^2 + \|O_n1-O^*_n\|^2 + \|O_{n+1}3-O^*_{n+1}\|^2$.

In the same embodiment, optimal model selection is achieved by Viterbi algorithm in search of a Viterbi path. The adaptive modeling engine 130 defines binary decision variables X and Y, wherein $X_n$ indicates a connection between consecutive stages, and $X_n(i, j)=1$ represents connection between model i from stage n is connected to model j at stage (n+1), and wherein $Y_n$ indicates model index at stage n. Because the adaptive modeling engine 130 would retain a preconfigured K number of top performing paths, $\Sigma_{(i,j)} X_n(i,j) \leq K$. Also, the adaptive modeling engine 130 generates connections according to a preconfigured path dynamics $Y_{n+1} = F(X_n, Y_n)$, wherein F is a rule stated as if $X_n(i, j)=1$ and $Y_n=i$ then $Y_{n+1}=j$. A best-performing path would have a minimal total loss across all stages, including a series of connections having minimal losses, that is, $\Sigma_n \|O_n Y_n - O^*_n\|^2$.

In the same embodiment, the adaptive modeling engine 130 initializes loss function value for all models in the first stage. For each stage, adaptive modeling engine 130 evaluates loss functions for all models by $\|O_n i - O^*_n\|^2$ wherein $O_n i$ is an output of model i at stage n, and $O^*_n$ is an actual response at stage n. For a selected connection, the adaptive modeling engine 130 updates total loss function for model j in stage (n+1) by use of total loss function for model i in stage (n) and $X_n(i,j)$ as $L_{n+1}(j) = \min\{X_n(i,j)\|O_n i - O^*_n\|^2\} + L_n(i)$ subject to $\Sigma_{(i,j)} X_n(i,j) \leq K$ where $L_0(i)=0$ for each i.

FIG. 5 depicts a flowchart for the knowledgebase (KB) update path ranking and pruning process, block 350 of FIG. 3, in accordance with one or more embodiments set forth herein.

In block 510, the adaptive modeling engine 130 eliminates models, parameter choices, optional input variables that had not been featured in the retained K paths from block 440 of FIG. 4 from the KB 133. Then adaptive modeling engine 130 proceeds with block 520.

In block 520, the adaptive modeling engine 130 updates model network of the KB 133 with a probability calculated by $\text{Prob(Updated Network)} = (1-\varepsilon_n) \times \text{Prob(Old Network)} + \varepsilon_n \times \text{Prob(New Network)}$. The adaptive modeling engine 130 utilizes reinforcement learning technique in updating the KB 133 by use of a new model network as generated by the case data. Then adaptive modeling engine 130 proceeds with block 530.

In block 530, the adaptive modeling engine 130 updates the exploration probability $\varepsilon_{n+1} = \varepsilon_n - 1/n$, where n is a number of cases/model networks stored in the KB 133. As noted, the exploration probability to explore a new model network decreases as the number of model networks in the KB 133 increases. Then adaptive modeling engine 130 terminates updating the KB 133 and returns to 360 of FIG. 3.

Certain embodiments of the present invention may offer various technical computing advantages, including an automated analytical modeling tool that generates a best-performing model network responsive to case data input, by use of reinforcement learning and dynamic programming. Certain embodiments of the present invention implement efficient and abstracted modeling process such that a complex analytical modeling is achieved without requiring extensive knowledge and design efforts of numerous aspects of models on a user of the modeling tool. Further, certain embodiments of the present invention may improve performance quality of model networks it produces over time as case data inputs are cumulated in the knowledgebase of the modeling tool once executed and evaluated to satisfactorily perform, by use of multi-stage loss function.

Figure 6:
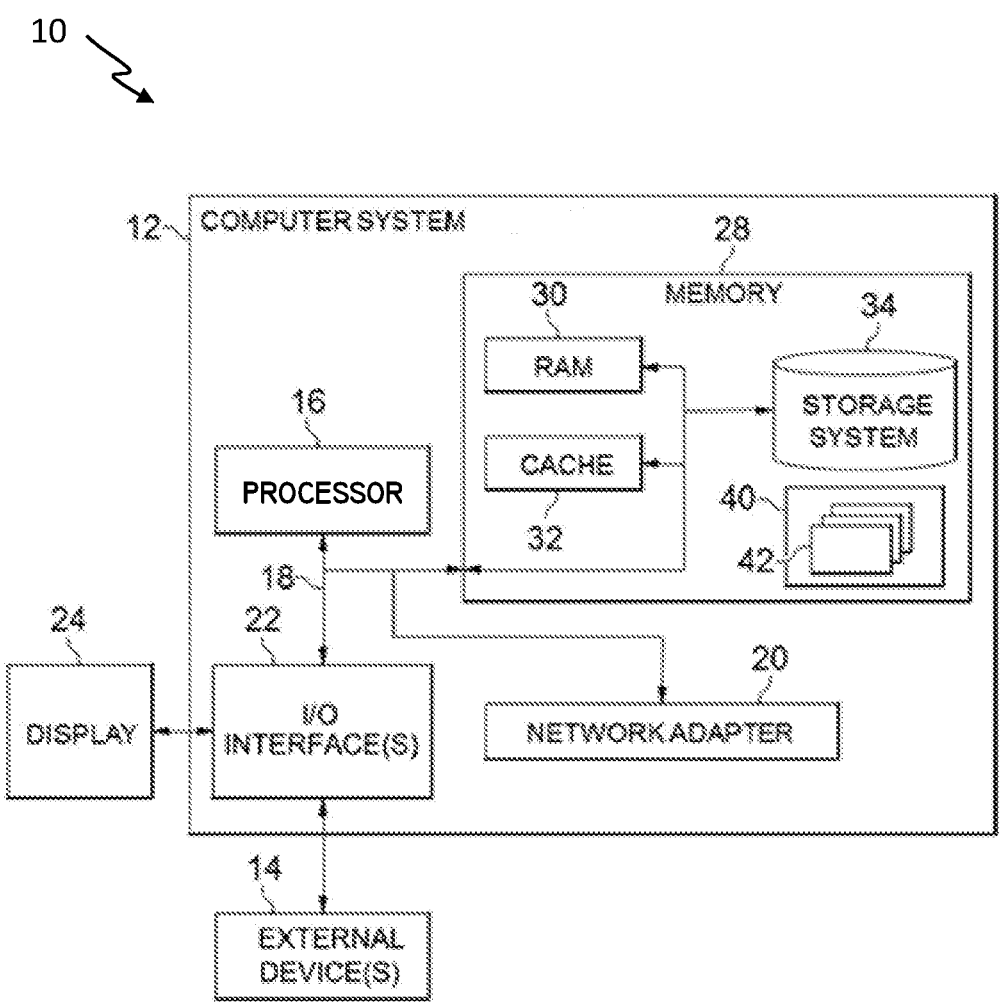
FIG. 6 depicts a cloud computing node according to an embodiment of the present invention.
Figure 7:
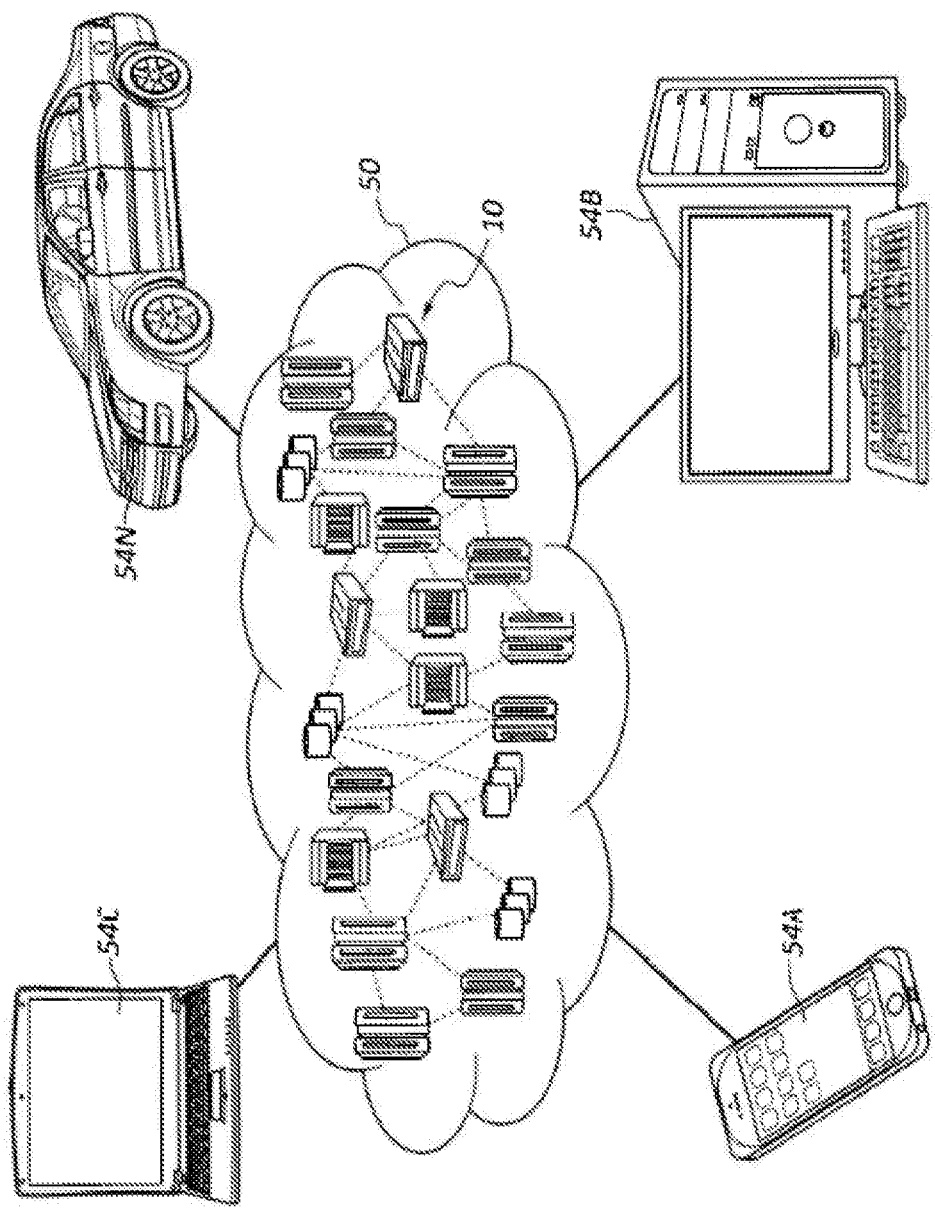
FIG. 7 depicts a cloud computing environment according to an embodiment of the present invention.
Figure 8:
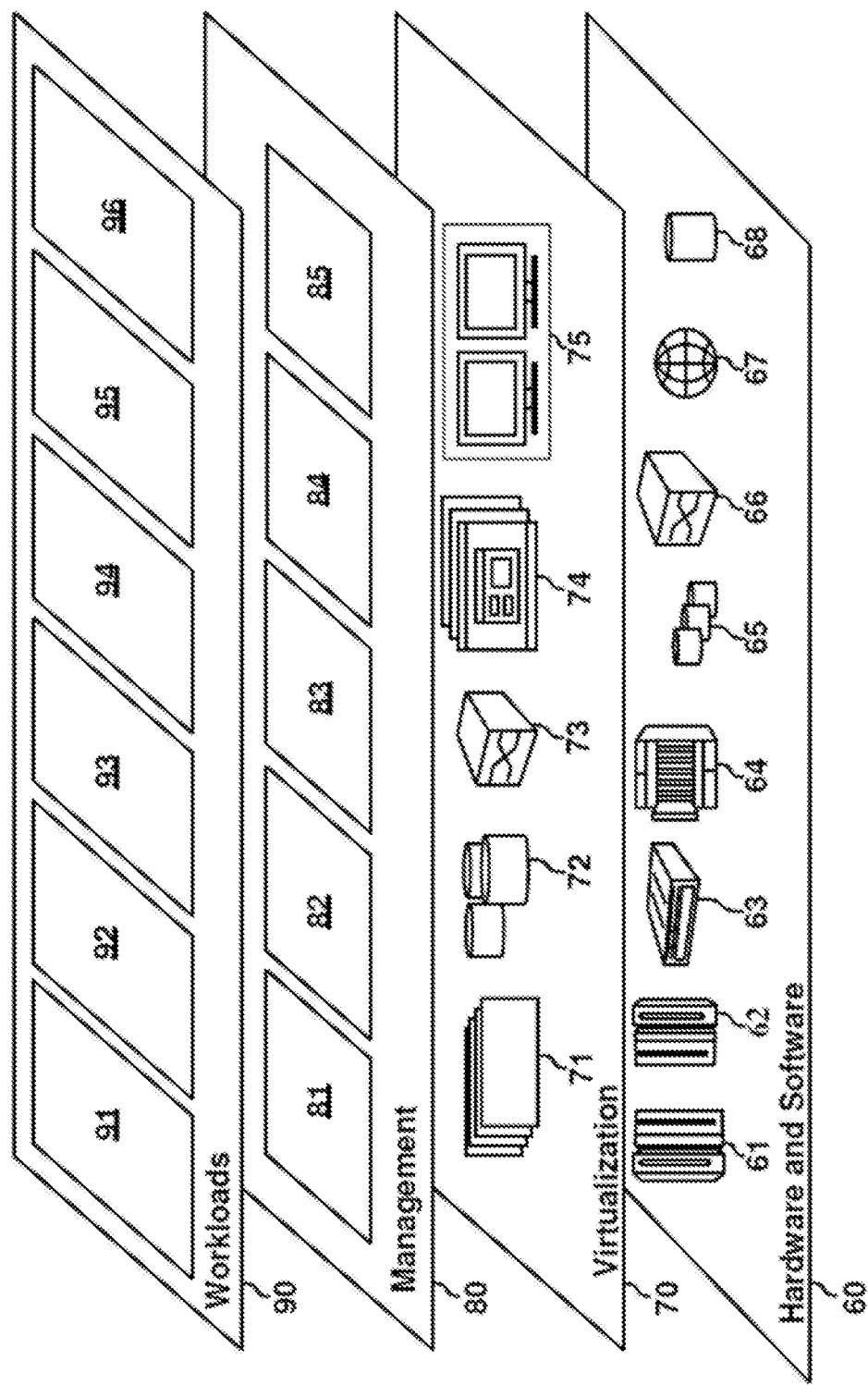
FIG. 8 depicts abstraction model layers according to an embodiment of the present invention.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the adaptive modeling engine 130 of FIG. 1. Program processes 42, as in the flowchart of FIG. 3, describing processes of the adaptive modeling engine 130, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 running one or more instances of the adaptive modeling engine 130 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the adaptive modeling engine 96, as described herein.

The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for adaptive analytical modeling, comprising:
   obtaining, by one or more processor of a computer, a case data input for an analysis in a number of stages;
   building all model connections between models in a knowledgebase with a complementary of an exploration probability, wherein the knowledgebase stores one or more model networks and the exploration probability indicating a likelihood to discover a new model network that meets preconfigured performance criteria and that is not stored in the knowledgebase;
   integrating new model connections based on the case data input into the knowledgebase with the exploration probability;
   selecting a predefined number of paths that perform best based on ranking respective model connections from the building and the integrating by use of preconfigured performance metrics, wherein each of the paths includes respective models in each of the stages and respective model connections from a first stage through a last stage;
   eliminating one or more poor models and attributes associated with respective poor models from the knowledgebase, wherein the poor models do not present in the paths from the selecting;
   updating a model network probability indicating a likelihood to use the model networks stored in the knowledgebase as resulted from the eliminating, by use of the exploration probability;
   calculating a new exploration probability for another case data input in using the knowledgebase as resulted from the updating; and
   producing the predefined number of paths from the selecting, without the poor models as resulted from the eliminating, to a user as a best-fit model for the analysis of case data.

2. The computer implemented method of claim 1, the integrating comprising:
   creating the new model connections based on the case data input;
   associating the model connections with the exploration probability; and
   adding the new model connections associated with the exploration probability to the knowledgebase.

3. The computer implemented method of claim 1, wherein the preconfigured performance metrics is a multi-stage model performance loss function calculated as a sum of squared error from a selected model in each stage from the first stage to the last stage.

4. The computer implemented method of claim 1, wherein the model network probability is a sum of a complementary of the exploration probability multiplied by a first model network probability of the knowledgebase prior to the eliminating and the exploration probability multiplied by a second model network probability of the new model connections.

5. The computer implemented method of claim 1, wherein the new exploration probability is a difference between the exploration probability and an inverse of a number of cases stored in the knowledgebase.

6. The computer implemented method of claim 1, wherein attributes associated with a model are combinations of parameter choices in the model and optional input variables into the model.

7. The computer implemented method of claim 1, wherein the exploration probability is represented by $\varepsilon_n$, the complementary of the exploration is represented by $(1-\varepsilon_n)$, the new exploration probability is formulated as $\varepsilon_{n+1}=\varepsilon_n-1/n$ for n number of cases in the knowledgebase prior to the case data input.

8. A computer program product comprising:
   a computer readable storage medium readable by one or more processor and storing instructions for execution by the one or more processor for performing a method for adaptive analytical modeling, comprising:
      obtaining, by the one or more processor, a case data input for an analysis in a number of stages;
      building all model connections between models in a knowledgebase with a complementary of an exploration probability, wherein the knowledgebase stores one or more model networks and the exploration probability indicating a likelihood to discover a new model network that meets preconfigured performance criteria and that is not stored in the knowledgebase;
      integrating new model connections based on the case data input into the knowledgebase with the exploration probability;
      selecting a predefined number of paths that perform best based on ranking respective model connections from the building and the integrating by use of preconfigured performance metrics, wherein each of the paths includes respective models in each of the stages and respective model connections from a first stage through a last stage;
      eliminating one or more poor models and attributes associated with respective poor models from the knowledgebase, wherein the poor models do not present in the paths from the selecting;

updating a model network probability indicating a likelihood to use the model networks stored in the knowledgebase as resulted from the eliminating, by use of the exploration probability;

calculating a new exploration probability for another case data input in using the knowledgebase as resulted from the updating; and producing the predefined number of paths from the selecting, without the poor models as resulted from the eliminating, to a user as a best-fit model for the analysis of case data.

9. The computer program product of claim 8, the integrating comprising:

creating the new model connections based on the case data input;

associating the model connections with the exploration probability; and adding the new model connections associated with the exploration probability to the knowledgebase.

10. The computer program product of claim 8, wherein the preconfigured performance metrics is a multi-stage model performance loss function calculated as a sum of squared error from a selected model in each stage from the first stage to the last stage.

11. The computer program product of claim 8, wherein the model network probability is a sum of a complementary of the exploration probability multiplied by a first model network probability of the knowledgebase prior to the eliminating and the exploration probability multiplied by a second model network probability of the new model connections.

12. The computer program product of claim 8, wherein the new exploration probability is a difference between the exploration probability and an inverse of a number of cases stored in the knowledgebase.

13. The computer program product of claim 8, wherein attributes associated with a model are combinations of parameter choices in the model and optional input variables into the model.

14. The computer program product of claim 8, wherein the exploration probability is represented by $\varepsilon_n$, the complementary of the exploration is represented by $(1-\varepsilon_n)$, the new exploration probability is formulated as $\varepsilon_{n+1}=\varepsilon_n-1/n$ for n number of cases in the knowledgebase prior to the case data input.

15. A system comprising:

a memory;

one or more processor in communication with the memory; and program instructions executable by the one or more processor via the memory to perform a method for adaptive analytical modeling, comprising:

obtaining, by the one or more processor, a case data input for an analysis in a number of stages;

building all model connections between models in a knowledgebase with a complementary of an exploration probability, wherein the knowledgebase stores one or more model networks and the exploration probability indicating a likelihood to discover a new model network that meets preconfigured performance criteria and that is not stored in the knowledgebase;

integrating new model connections based on the case data input into the knowledgebase with the exploration probability;

selecting a predefined number of paths that perform best based on ranking respective model connections from the building and the integrating by use of preconfigured performance metrics, wherein each of the paths includes respective models in each of the stages and respective model connections from a first stage through a last stage;

eliminating one or more poor models and attributes associated with respective poor models from the knowledgebase, wherein the poor models do not present in the paths from the selecting;

updating a model network probability indicating a likelihood to use the model networks stored in the knowledgebase as resulted from the eliminating, by use of the exploration probability;

calculating a new exploration probability for another case data input in using the knowledgebase as resulted from the updating; and producing the predefined number of paths from the selecting, without the poor models as resulted from the eliminating, to a user as a best-fit model for the analysis of case data.

16. The system of claim 15, the integrating comprising:

creating the new model connections based on the case data input;

associating the model connections with the exploration probability; and adding the new model connections associated with the exploration probability to the knowledgebase.

17. The system of claim 15, wherein the preconfigured performance metrics is a multi-stage model performance loss function calculated as a sum of squared error from a selected model in each stage from the first stage to the last stage.

18. The system of claim 15, wherein the model network probability is a sum of a complementary of the exploration probability multiplied by a first model network probability of the knowledgebase prior to the eliminating and the exploration probability multiplied by a second model network probability of the new model connections.

19. The system of claim 15, wherein the new exploration probability is a difference between the exploration probability and an inverse of a number of cases stored in the knowledgebase, such that the exploration probability is represented by $\varepsilon_n$, the complementary of the exploration is represented by $(1-\varepsilon_n)$, the new exploration probability is formulated as $\varepsilon_{n+i}=\varepsilon_n-1/n$ for n number of cases in the knowledgebase prior to the case data input.

20. The system of claim 15, wherein attributes associated with a model are combinations of parameter choices in the model and optional input variables into the model.

* * * * *